(12) United States Patent
Dawson et al.

(10) Patent No.: US 8,171,408 B2
(45) Date of Patent: May 1, 2012

(54) DYNAMIC LOCATION GENERATION WITHIN A VIRTUAL WORLD

(75) Inventors: Christopher J. Dawson, Arlington, VA (US); Rick A. Hamilton, II, Charlottesville, VA (US); Clifford A. Pickover, Yorktown Heights, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 12/336,802

(22) Filed: Dec. 17, 2008

(65) Prior Publication Data

US 2010/0153860 A1    Jun. 17, 2010

(51) Int. Cl.
*G06F 15/00*    (2006.01)
*G06F 16/00*    (2006.01)
(52) U.S. Cl. ........................................ 715/706; 715/738
(58) Field of Classification Search .......... 715/700–715, 715/763–765, 851–853, 736–738
See application file for complete search history.

(56) References Cited

U.S. PATENT DOCUMENTS 7,143,358 B1    11/2006  Yuen
7,168,051 B2    1/2007   Robinson et al.
2008/0081701 A1    4/2008   Shuster
2008/0263458 A1*   10/2008  Altberg et al. ................ 715/757
2009/0227374 A1*   9/2009   Tirpak et al. .................... 463/40

OTHER PUBLICATIONS

Chen, H. et al, "Implementation of Ubiquitous Personal Study Using Web 2.0 Mash-up and OSS Technologies," IEEE 22nd International Conference on Advanced Information Networking and Applications Workshops 2008, pp. 1573-1578.
Celentano, A. et al., "Observing and Adapting User Behavior in Navigational 3D Interfaces," IEEE/ACM Digital Library AVI'04, May 25-28, 2004 (LE), Italy, pp. 275-282.
Benford, S. et al, "Understanding and Constructing Shared Spaces with Mixed-Reality Boundaries," IEEE/ACM Transactions on Computer-Human Interaction, vol. 5, No. 3, Sep. 1998, pp. 185-223.
Shum, H. et al., "Simulating Interactions of Avatars in High Dimensional State Space," IEEE/ACM Digital Library, Redwood City, California, Feb. 15-17, 2008, pp. 131-138.

* cited by examiner

*Primary Examiner* — Cao "Kevin" Nguyen
(74) *Attorney, Agent, or Firm* — William E. Schiesser; Ronald A. D'Alessandro; Keohane & D'Alessandro PLLC (57) ABSTRACT

An approach is provided for dynamic loading and rendering of avatar's initial login environment. The approach consists of a method and a system for dynamically rendering locations from a preference list of locations most likely to be visited by an avatar. In one embodiment the method consists of creating a preference list of locations most likely to be visited by the avatar, rendering a dynamically built continuous environment populated from such preference list of locations most likely to be visited by the avatar, and caching and thereafter rendering at least one of the locations from the preference list of locations most likely to be visited by said avatar.

20 Claims, 9 Drawing Sheets

| PREFERENCE LIST | GRID COORDINATE |
|---|---|
| SYSTEM P ROOM  61 | SYSTEM - 7855; 7859  67 |
| BOOK STORE FICTION ROOM  62 | BSF - 1712; 1715  68 |
| MUSIC STORE ROOM  63 | CCY - 0221  69 |
| SOFTWARE ROOM  64 | SWR - 1123  69.1 |
| BUSINESS INNOVATION CENTER  65 | BIC - 3850  69.2 |
| NEXT  66 | NEXT ...  69.3 |

DYNAMIC LOCATION GENERATION WITHIN A VIRTUAL WORLD

FIELD OF THE INVENTION

This invention relates generally to virtual universes and more specifically to improving the method of defining avatar's initial three dimensional environment.

BACKGROUND OF THE INVENTION

Virtual Universes (VUs) or Virtual Worlds (VWs) are computer-based simulated environments intended for its users or residents to traverse, inhabit and interact via avatars, which are graphical representations the users select that others may see, often taking the form of cartoon-like humans. These types of virtual universes are now most common in massively multiplayer online games such as Second Life®, which is a trademark of Linden Research Inc. in the United States. Many VUs are represented using 3-D graphics and landscapes, and are populated by many thousands of avatars.

Many regions, which are virtual areas of land within the VU, typically residing on a single server, contain complex environments with a large number of objects. Regions are in turn subdivided into areas such as buildings or rooms. When an avatar enters a virtual world, based on its login environment, specific regions and areas are loaded and displayed by default. Avatars and their login environments, as well as everything else that is visual, consist of UUID (unique identifier standard used in software construction, standardized by the Open Software Foundation) tied to geometric data that is in turn distributed to users as textual coordinates, textures that are distributed to users as graphic files, i.e. JPEG2000 format files, and effects data that is rendered by the user's client according to the user's preferences and user's device capabilities.

After logging in to a virtual world, an avatar is provided with an initial login environment. Additionally, the avatar is placed in a specific location or a region determined by the login environment. For instance, an avatar associated with a new user is often placed in a VU's "learning region", where such new user can learn the rules and laws of the virtual world and about regions the current VU consists of. On the other hand, more experienced users may either choose an initial login location, or may simply be placed in the last location visited before they logged out of the VU.

As is known in the art, avatars may traverse the environment by simply walking or flying to new regions within the universe. This may be useful for a new user when, for example, traversing a learning center to understand how the VU operates. However, for the ever increasing number of seasoned avatars, this behavior is limiting.

A mature avatar, for instance, may have multiple favorite locations to visit. However, using the existing loading and traversing techniques, the avatar would be required to teleport from place to place repeatedly in order to visit each of the desired locations. This becomes very time and resource consuming and inconvenient.

SUMMARY OF THE INVENTION

In the first embodiment, there is a description of a method for dynamically rendering locations from a preference list of locations most likely to be visited by an avatar. The described method comprises: creating a preference list of locations most likely to be visited by the avatar, rendering a dynamically built continuous environment populated from the preference list of locations most likely to be visited by the avatar, and caching and thereafter rendering at least one of the locations from said preference list of locations most likely to be visited by the avatar.

In the second embodiment, there is a description of a computer system for dynamically rendering locations from a preference list of locations most likely to be visited by an avatar. In this embodiment, the system comprises: at least one processing unit, memory operably associated with the at least one processing unit and a preference assessment tool storable in memory and executable by the at least one processing unit. The preference assessment tool comprises: a probability calculation component configured to calculate probability of the next visit to the location by the avatar, a prioritization component configured to compare the probabilities of the next visit to the location by the avatar to determine a priority of the locations to be displayed on the preference list and a rendering component configured to continuously render the set of locations in the virtual universe, where the locations are prioritized based on the probability of avatar's next visit.

In the third embodiment, there is a computer-readable medium storing computer instructions, which when executed, enable a computer system to dynamically render locations from a preference list of locations most likely to be visited by an avatar in a virtual universe. In this embodiment, the computer instructions comprise: creating a preference list of locations most likely to be visited by the avatar, rendering a dynamically built environment populated from the preference list of locations most likely to be visited by the avatar, and caching and thereafter rendering at least one of the locations from the preference list of locations most likely to be visited by the avatar.

In the forth embodiment, there is a method for deploying a rendering tool for use in a computer system that provides rendering locations from a preference list of locations most likely to be visited by an avatar, the method comprising: providing a computer infrastructure operable to: create a preference list of locations most likely to be visited by the avatar, render a dynamically built continuous environment populated from the preference list of locations most likely to be visited by the avatar, and cache and thereafter render at least one of the locations from the preference list of locations most likely to be visited by the avatar.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

To illustrate the idea suggested in the current invention the following example is considered: an experienced user has four main areas within the virtual world that he or she usually needs to teleport to. These areas are: an office space, a shopping mall, a personal space and a friend's personal space. As is known in the art, every time avatar logs into a VU, he or she is placed either in a default location, most often it is the personal space, or the last location visited. Upon each session within such VU, avatar usually wants to visit each of the four locations, which therefore presently requires at least three teleportations, which are very recourse and time consuming.

Thus, there exists a need for a method and a system for dynamic loading of avatar's initial three dimensional environment, where such avatar is placed upon logging in to a virtual world, consistent of preferred, traditionally used set of locations, or locations most likely to be visited by the avatar, or portions thereof, to appear to be one continues single environment such that each of such locations can be accessed by walking or flying, and without the need to teleport.

Accordingly, embodiments of the present invention are directed to a system and a method for dynamically loading a three dimensional environment to be displayed upon an avatar's login to a virtual world. An initial location of the avatar comprises a personalized combination of the current most desirable locations or portions thereof appearing as a single continuous environment such that each of such locations can be accessed by walking or flying, and without the need to teleport. The content used to build such initial location is based upon recent history, crowd-sourcing, users' personal preferences, and any other commonality or selection criteria as may be implemented In the first embodiment, there is a description of a method for dynamically rendering locations from a preference list of locations most likely to be visited by an avatar. The described method comprises: creating a preference list of locations most likely to be visited by the avatar, rendering a dynamically built continuous environment populated from the preference list of locations most likely to be visited by the avatar, and caching and thereafter rendering at least one of the locations from said preference list of locations most likely to be visited by the avatar.

In the second embodiment, there is a description of a computer system for dynamically rendering locations from a preference list of locations most likely to be visited by an avatar. In this embodiment, the system comprises: at least one processing unit, memory operably associated with the at least one processing unit and a preference assessment tool storable in memory and executable by the at least one processing unit. The preference assessment tool comprises: a probability calculation component configured to calculate probability of the next visit to the location by the avatar, a prioritization component configured to compare the probabilities of the next visit to the location by the avatar to determine a priority of the locations to be displayed on the preference list and a rendering component configured to continuously render the set of locations in the virtual universe, where the locations are prioritized based on the probability of avatar's next visit.

In the third embodiment, there is a description of a computer-readable medium storing computer instructions, which when executed, enable a computer system to dynamically render locations from a preference list of locations most likely to be visited by an avatar in a virtual universe. In this embodiment, the computer instructions comprise: creating a preference list of locations most likely to be visited by the avatar, rendering a dynamically built environment populated from the preference list of locations most likely to be visited by the avatar, and caching and thereafter rendering at least one of the locations from the preference list of locations most likely to be visited by the avatar.

Figure 1:
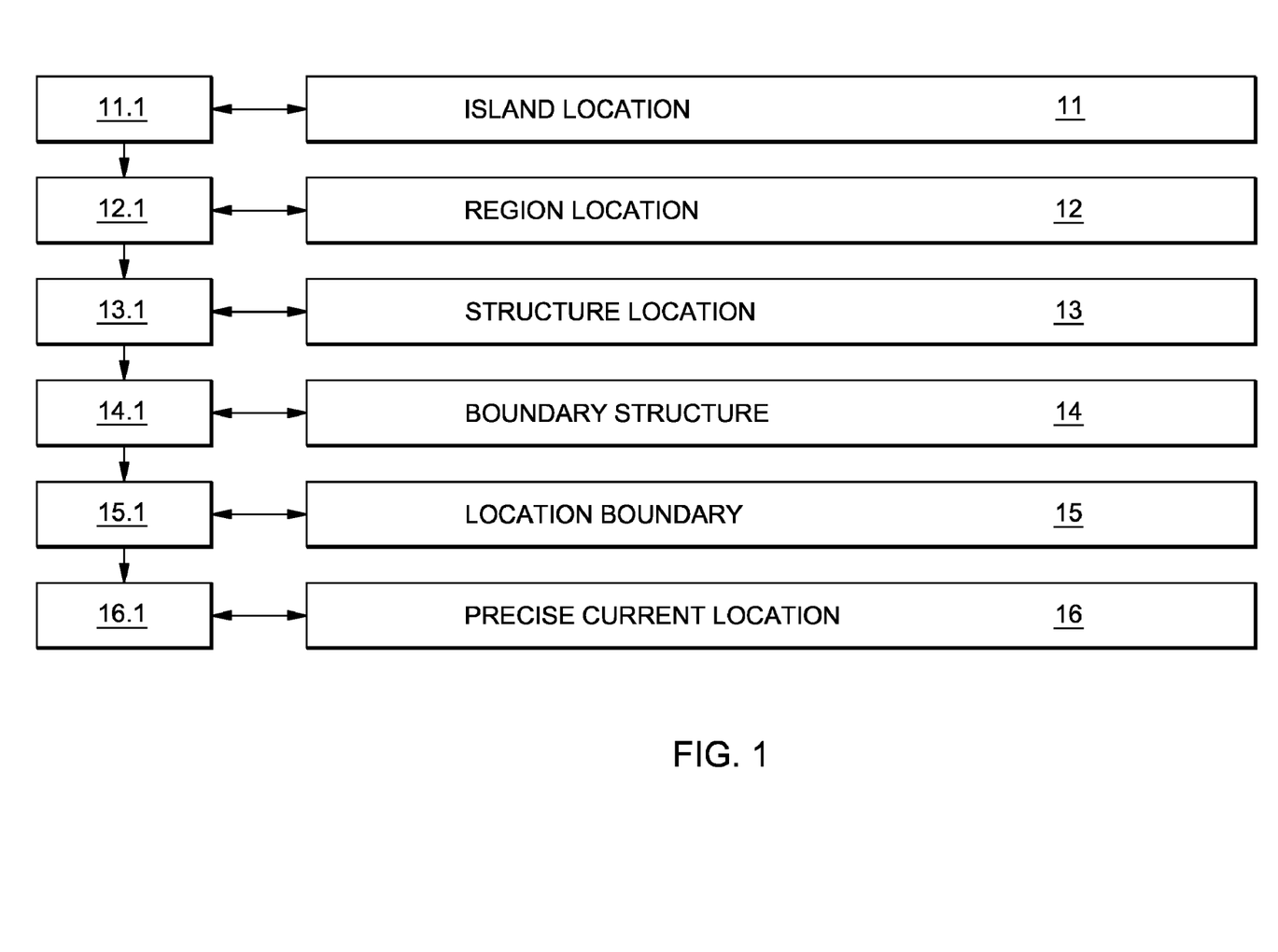
FIG. 1 shows a high-level schematic diagram showing existing hierarchy of locations within a sample Virtual Universe.

FIG. 1 shows a high-level schematic diagram showing an existing hierarchy of locations within a sample Virtual Universe. As shown in FIG. 1, current virtual universe 11 is an island whose location is defined by island location coordinates 11.1. Shown island 11 consists of at least one region 12 whose location is in turn also defined by coordinates 12.1 that are dependent on the set of coordinates 11.1. Further, region 12 consists of at least one structure 13, which structure is defined by location coordinates 13.1. Structure 13, in turn, consists of at least one building 14 which is defined by boundaries 14.1 that are dependent on coordinates 13.1. As further illustrated by FIG. 1, building 14 consists of at least one room 15, defined by location boundaries 15.1 that are dependent on boundaries 14.1. Finally, the precise current location 16 of an avatar is defined by coordinates 16.1 that are dependent on the boundaries 15.1.

This example hierarchy of locations within a sample Virtual Universe is only illustrative of some locations that may be found in a virtual region and is not limiting. Furthermore, the number of virtual regions 12 shown in FIG. 1 is only for illustration purposes and those skilled in the art will recognize that there may be many more regions found in a typical virtual universe, or even only one region in a small virtual universe. As is illustrated by this example, precise location 16 of an avatar is dependent on the coordinates 12.1 of the region 12 location and therefore avatar's access to VU locations is limited by the highest level of hierarchical environment, i.e., the island 11, which in essence is defined by the initial location 16 where avatar is placed upon login.

In a sample virtual world environment, currently illustrated by FIG. 1, one cannot travel from the current location to another location beyond the highest level of the hierarchical environment, i.e., island 11 in FIG. 1, by simply walking. Persons in physical world must employ alternative means of transportation such as ships or airplanes to reach other islands or continents. Similarly, an avatar must teleport when it wants to travel from one region to another.

Figure 2:
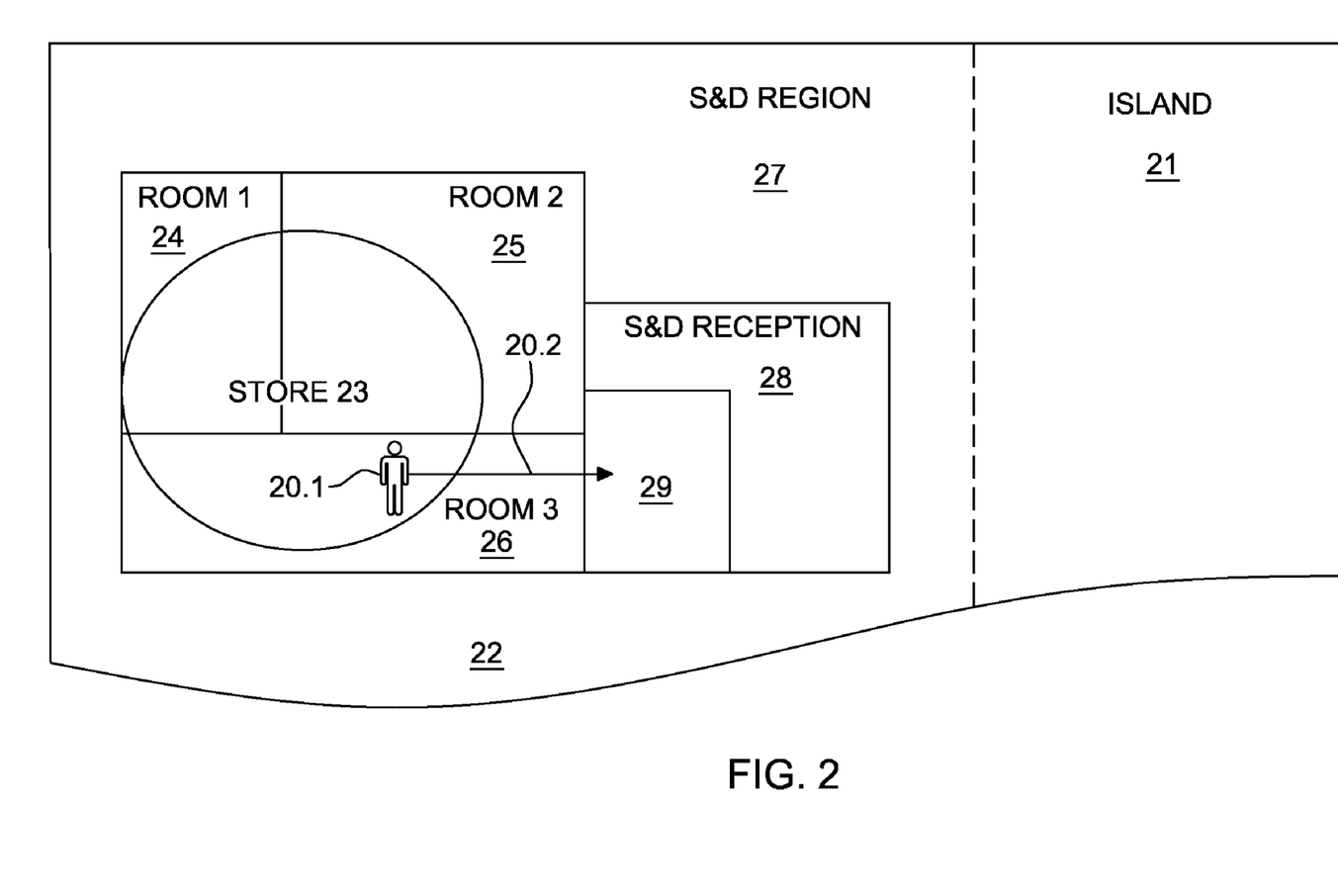
FIG. 2 shows a block diagram of a sample default login environment.

FIG. 2 illustrates a sample avatar's login environment. In the shown example, upon successful login, the avatar is placed in a systems department 26, which is located in a store 23, which is located in a sales and distribution (S & D) complex located in an S & D region 27, which is in turn located on an island 21. When avatar successfully logs in, entire island 21 is not rendered for the avatar, as computation resources are at a premium and virtual worlds are very graphics intensive applications. Alternatively, a location based subset 22 of island 21 is loaded and in turn is cached. However, not the whole location based subset 22 is rendered and is visible to avatar 20.1, but only the default load consisting of rooms 24, 25 and 26 is rendered and displayed for the avatar 20.1.

Areas outside of store 23 are not loaded upon avatar's log-in. Instead, they are rendered and cached real time only if avatar accesses these areas. As is shown in FIG. 2, as avatar 20.1 travels 20.2 out of store room 26, data regarding the target environment S & D reception 28 is cached so that it can be rendered and displayed quickly upon arrival of avatar 20.1. In one embodiment, a trailing area, equivalent in size to the newly cached area is dropped from the current rendering such that the new avatar view is comprised of the newly cached area and only a subset of the original environment. This process continues as avatar 20.1 traverses through various parts of the island 21. However, if avatar 20.1 wishes to visit a location that is not part of the island 21, then the avatar leaves the current structure and the current coordinate system behind and teleports to a new location.

Figure 3:
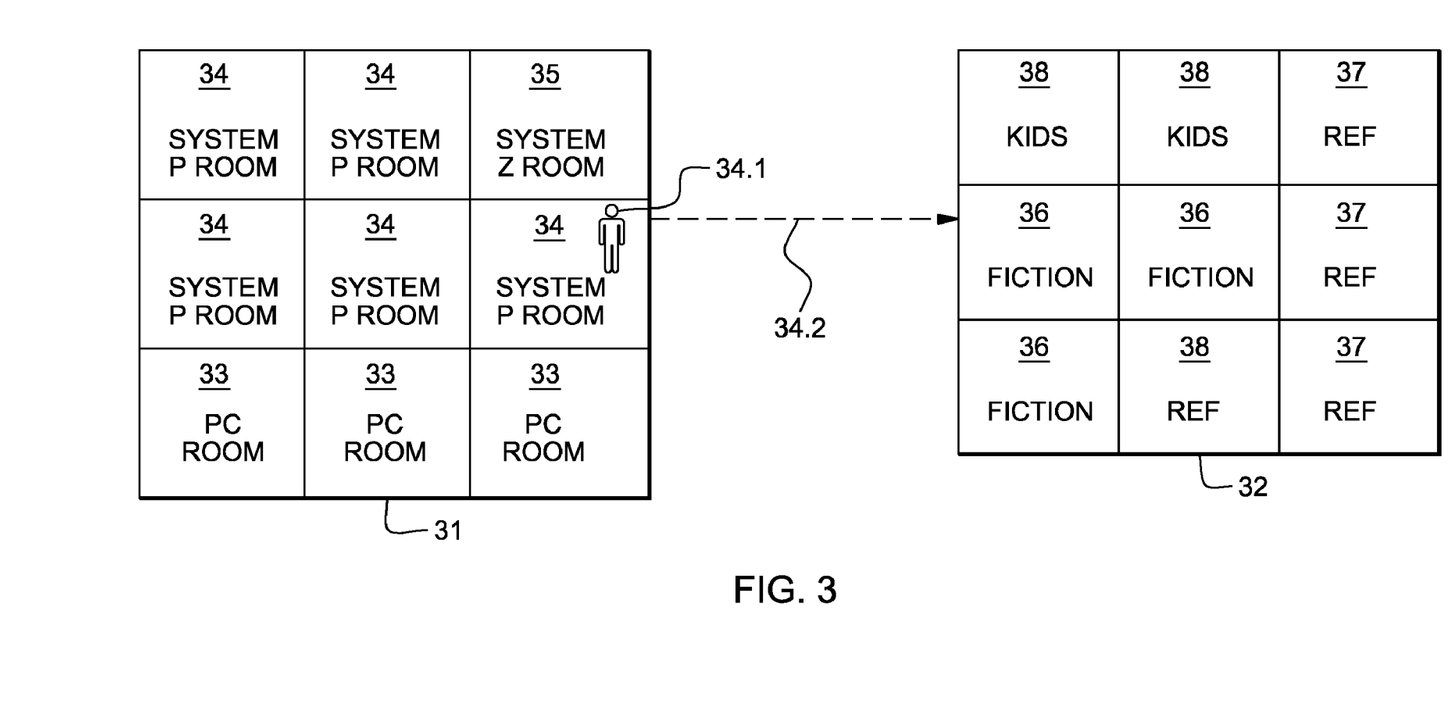
FIG. 3 illustrates existing methods of loading default login locations and visiting preferred locations.

FIG. 3 illustrates existing method of loading default location and visiting preferred locations. The shown graphic depicts an example "zoom-in" view of the default location for avatar 34.1 within store 31. As illustrated, avatar 34.1 is initially located in system p room 34 of store 31. In the shown example, avatar 34.1 only visits system p room 34 and does not visit system z room 35 or PC rooms 33.

As further illustrated by FIG. 3, another location regularly visited by avatar 34.1 is fiction section 36 of book store 32 located on another island 39. Presently, avatar 34.1 must teleport 34.2 back and forth between these desired locations. Assuming, that rendering of each room of store 31 requires one full server cycle, (shown and discussed in details further) when avatar and his/her default environment are rendered, four—ninth of the server cycles are wasted when rendering locations that will not be visited by the avatar, i.e., system room z 35 and three pc rooms 33.

Additionally, when avatar 34.1 teleports 34.2 to fiction section 36 of book store 32, six-ninths of the server cycles are wasted for rendering sections of the book store 32 that the avatar does not frequent. Illustrated example is indicative of two problems: 1) system resources are wasted rendering data that is not required or desired by the avatar; 2) avatar's time is wasted teleporting from one location to another.

Figure 4:
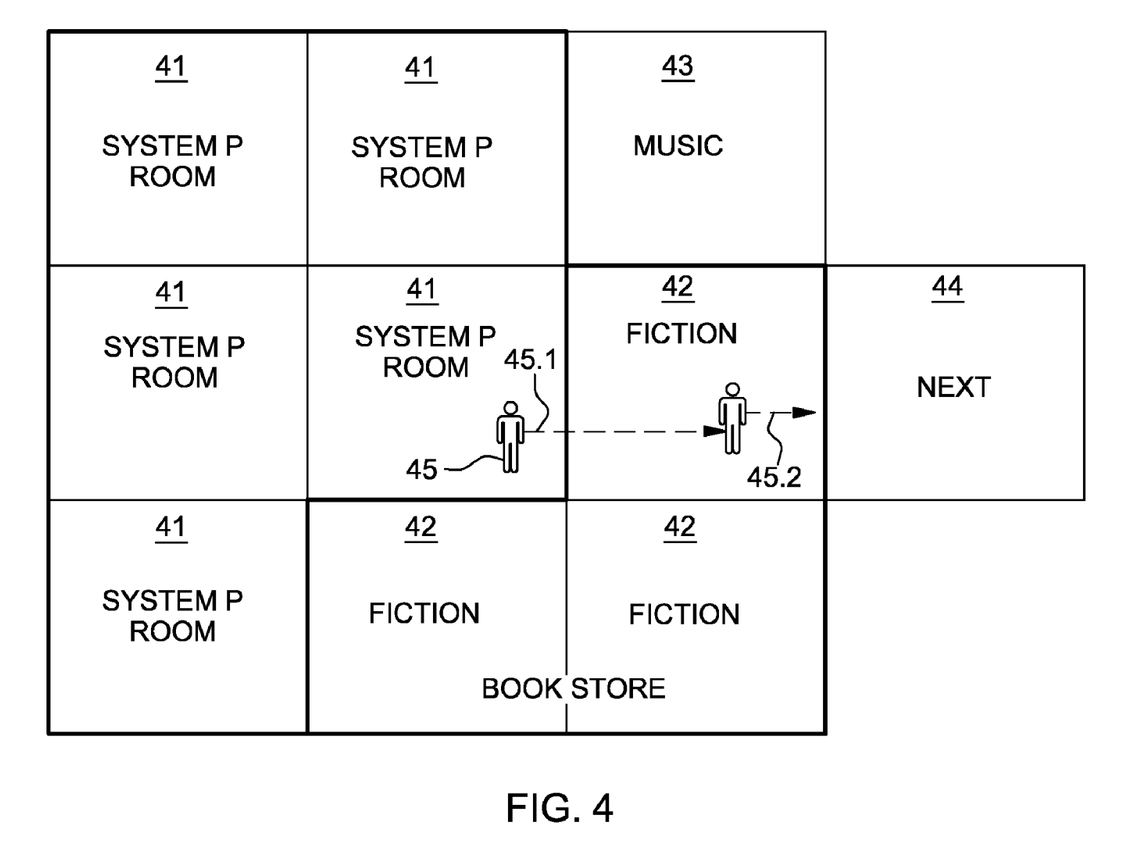
FIG. 4 illustrates the method for continuously loading locations within one login environment.

Preferred embodiment of the current invention continues to render a default area of the current size; however, it populates and manages the data in a more efficient manner. FIG. 4 depicts an example preferred embodiment of this invention. As FIG. 4 illustrates, the default load in the preferred embodiment is the same relative size—nine blocks that represent the various system resources consumed, however only the areas of interest of avatar 45 are loaded within default environment 40. Further illustrating the preferred embodiment, only system p 41 area is loaded when avatar executes a new login. The remaining resources, i.e., the remaining four blocks in the current example are rendered as other preferred locations for the given avatar 45 until the load space is exhausted.

Further, as demonstrated by FIG. 4, aside from the default location of system p room 41, avatar's 45 rendered environment load includes fiction section 42 of the book store (not shown), and music section 43 of the Circuit City® like store (not shown). This rendering presents avatar 45 with the ability to quickly walk from one favorite location to another without the need to teleport and leave the previous environment behind. As further illustrated by FIG. 4, avatar 45 seamlessly walks 45.1 from system p room 41 to fiction section 42 of the book store (not shown).

Figure 5:
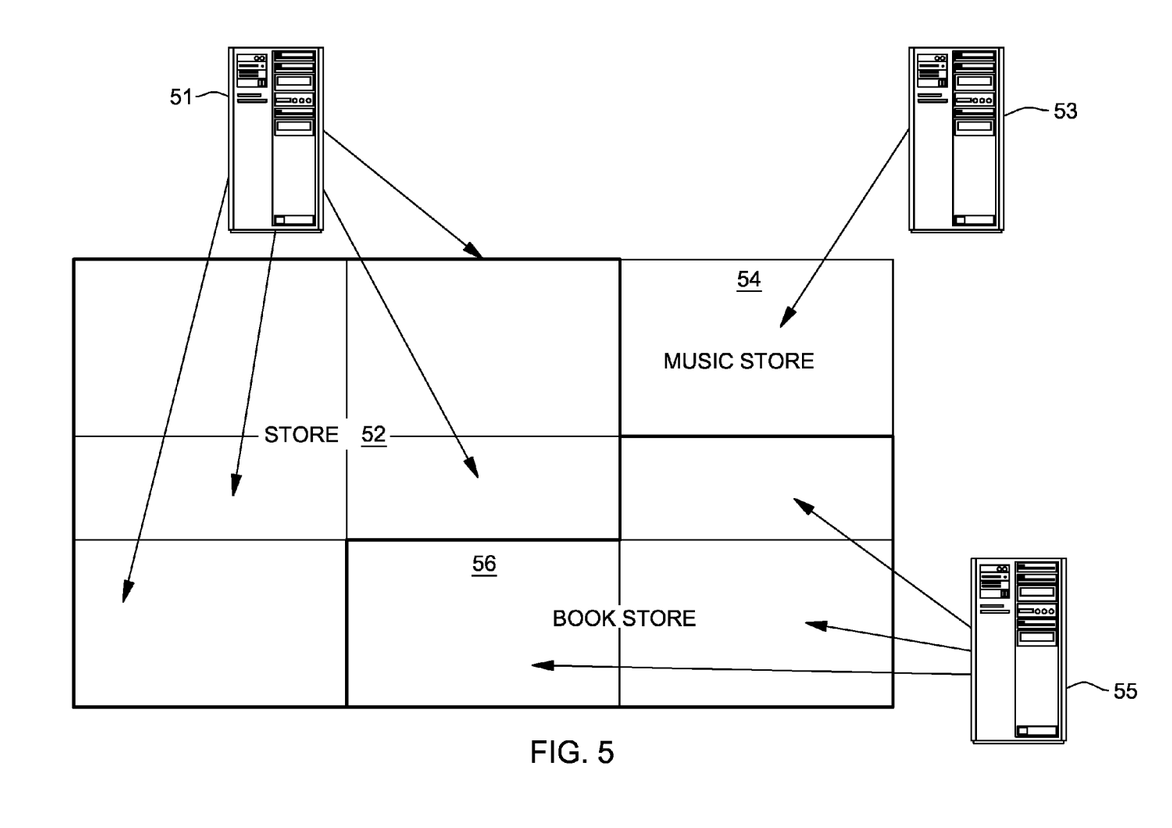
FIG. 5 shows current usage of servers required to control a plurality of environments.

FIG. 5 illustrates additional advantage of the current embodiment, mentioned earlier in [0026] as it also provides increased performance in loading and rendering locations for a given avatar. As illustrated, such increased performance is achieved by employing plurality of servers when rendering location data. More specifically, rather than one SIM server 51 or server group (not shown) responsible for loading the area 52, multiple servers 53, 55 or groups of servers (not shown) simultaneously render data for the corresponding environments, i.e., fiction sections 56 of the book store (not shown) and music sections 54 of the Circuit City® like store.

In addition to the enhanced load and location rendering introduced by one embodiment of the current invention, a new caching and traversing algorithm is also introduced. Referring once again to FIG. 3 and FIG. 4, the traditional method of caching and traversing loads reference section 37 of book store 39 as avatar 45 continues to traverse the current environment, as in FIG. 4, to the right.

Figure 6:
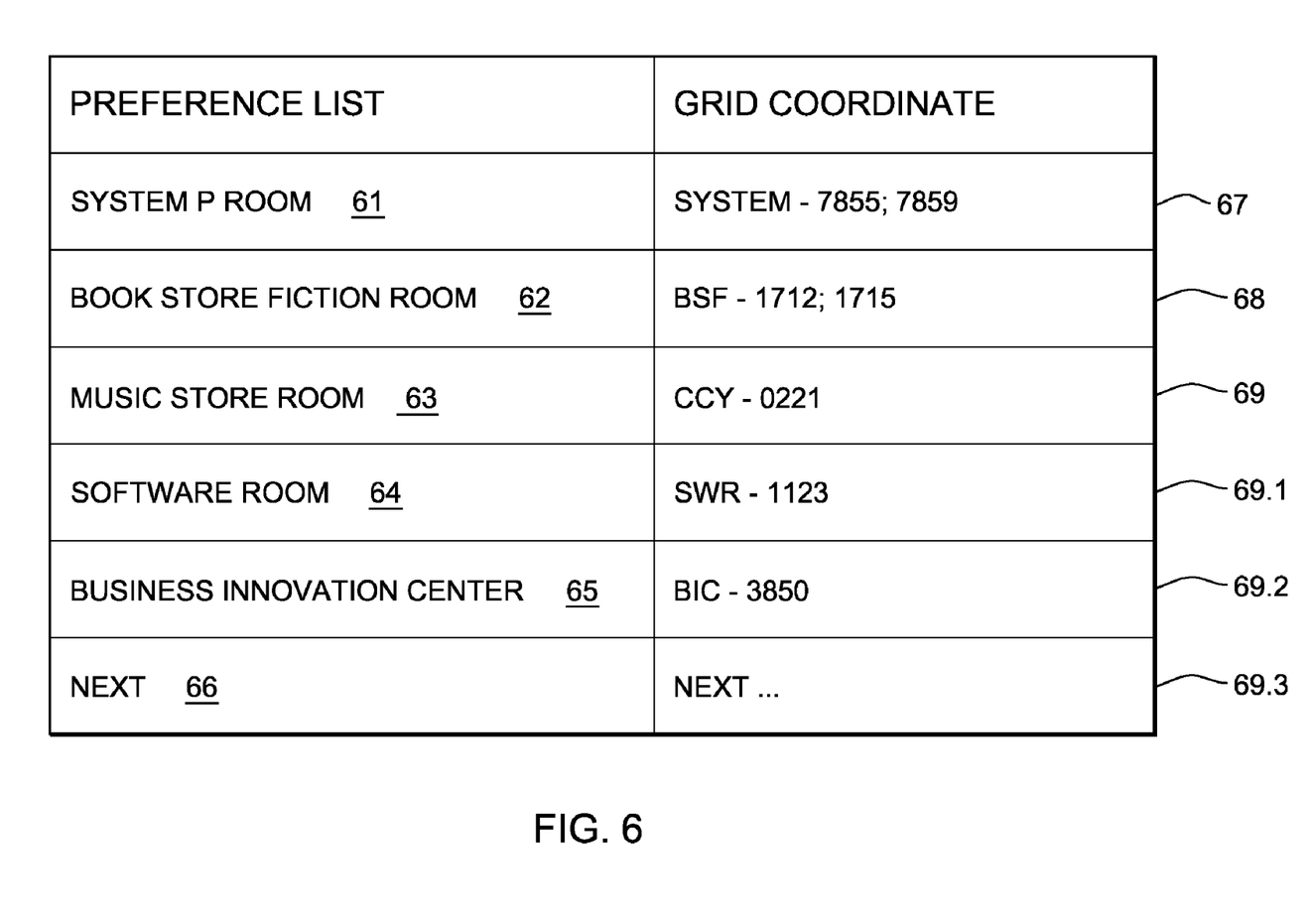
FIG. 6 illustrates a sample preference list of locations.

FIG. 6 illustrates connection between avatar's locations preference list and grid coordinates of servers controlling rendering of such locations. Preference list 60 consists of locations most likely to be visited by avatar in order of probability of such visit. System p room 61 is controlled by server (s) at grid coordinate 67. Book store fiction room 62 is controlled by server(s) at grid coordinate 68. Circuit City® like music room 63 is controlled by server(s) at grid coordinate 69. Software room 64 is controlled by server(s) at grid location 69.1. Business Innovation Center 65 is controlled by server(s) at grid location 69.2. Next most likely location 66 is controlled by server(s) at next grid location 69.3.

Figure 7:
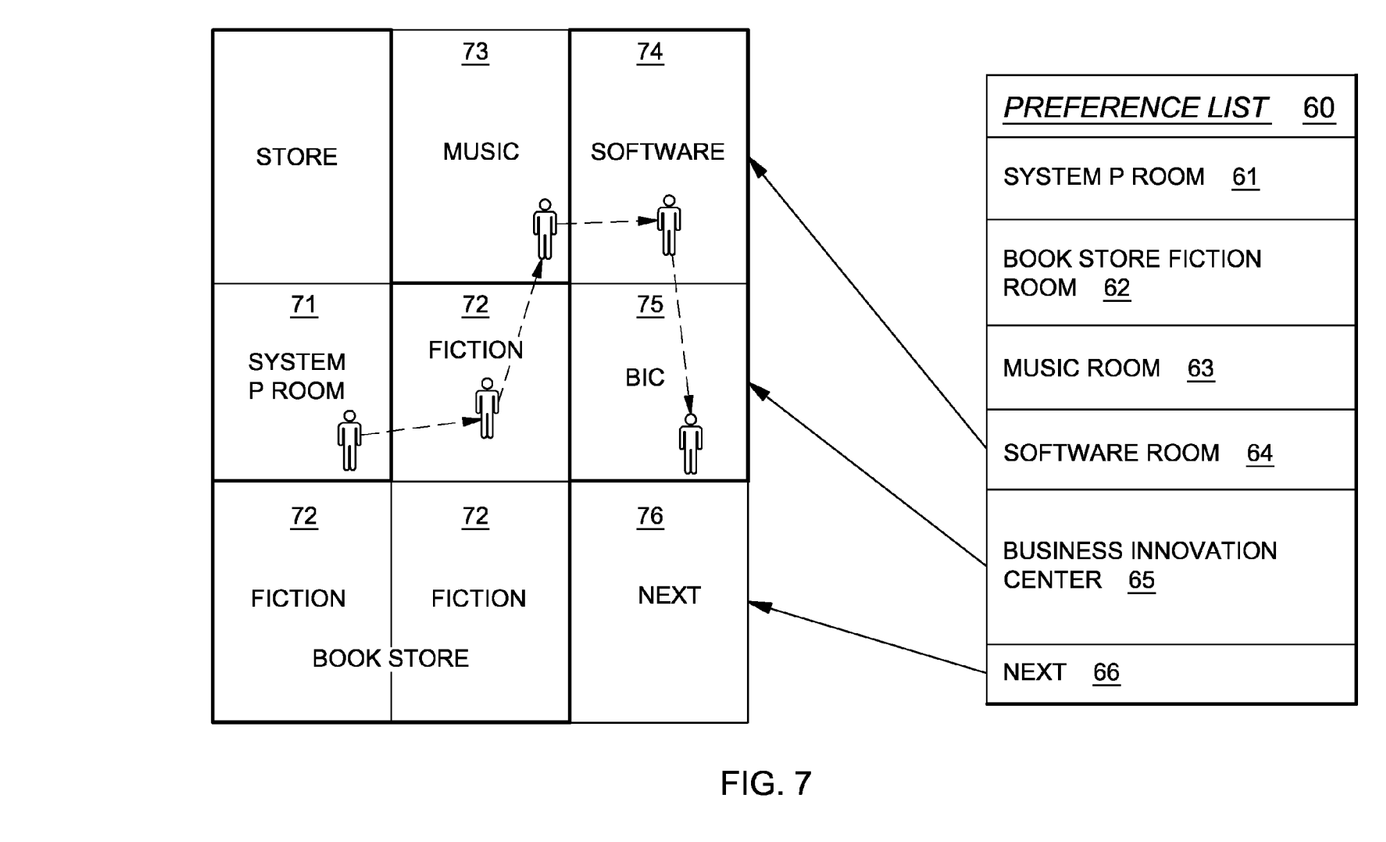
FIG. 7 illustrates a preference based caching and rendering method to be used for dynamically creating a login environment.

FIG. 7 depicts the process of dynamically building an environment by illustrating loading of next most likely location for traversing avatar when such avatar extends beyond any of the currently loaded boundaries. As illustrated by FIG. 7, as avatar 71 exits Circuit City® like store's music department 73, rather than caching and loading the next department in such store, which is what presently occurs, the method suggested by the current invention invokes the caching and loading of avatar's 71 next favorite location obtained from the preference list 60, which, in the currently illustrated example, is software room 74.

In another embodiment, as avatar 71 continues into open space 75 after exhausting preferred locations from preference list 60, the algorithm loops back to the beginning of the list and reloads preference 61. In another embodiment, a random location is loaded. In yet another embodiment, the owner of previous VU location selects the location to be loaded and the preference list to be used.

In the preferred embodiment, a location preference list for a given avatar is dynamically constructed based on, but not limited to, locations visited, number of times visited and duration of visits. Depending on these usage patterns, the default location and preference list of locations automatically updates. For instance, if an avatar spent most of the last 3 days in the business innovation center, it is likely that at the next login, avatar will end up there again. As a result of applying the method suggested by the current invention, such location would move up to the top of the preference list and bump down all the other locations on the preference list accordingly.

In one embodiment, an avatar manually edits default location and preference list. In another embodiment, preference list is a complete history of locations visited by the avatar.

In yet another embodiment, smaller regions or partial self contained fragments of locations, such as embodied by store aisles, are used. In such an embodiment, if an avatar visits aisles 1, 2, and 5 of one bookstore and aisles 3 and 12 of another bookstore, these aisles are automatically combined. This combination allows for a new rendering to be created that is an aggregate of aisles from plurality of different stores. Further, indicators are provided to avatars in these kinds of renderings that indicate the stores that originally contained the particular aisles.

To further illustrate such an embodiment, the following example is considered: one aisle in such aggregate rendering of aisles from different stores, has a visible unique descriptive logo, text, graphic, lighting, musical background, or audio message associated with the aisle that defines this aisle as being an aisle from a particular store. This aisle identification in such aggregate rendering further provides advertisement services for an entire store.

In another embodiment, the preference list is dynamically constructed and is updated based on locations for which a user has expressed a specific interest in. In such an embodiment, the user upon visiting a real life store and learning of a product, service or price that such user has specific interest in, and upon further learning that the store has presence in the virtual world, such user, while in the virtual world, requests that such store or a store's department or aisle that offers such product, service or price be included in the preference list.

In another embodiment, the preference list of locations is arranged based on crowd sourcing. In such an embodiment, users or communities of users offer their commentaries and ratings which amount to votes for locations, or fragments of such locations. Such stores or fragments of stores with the most votes are then added to the preference list of locations, and thereafter arranged according to their votes.

Figure 8:
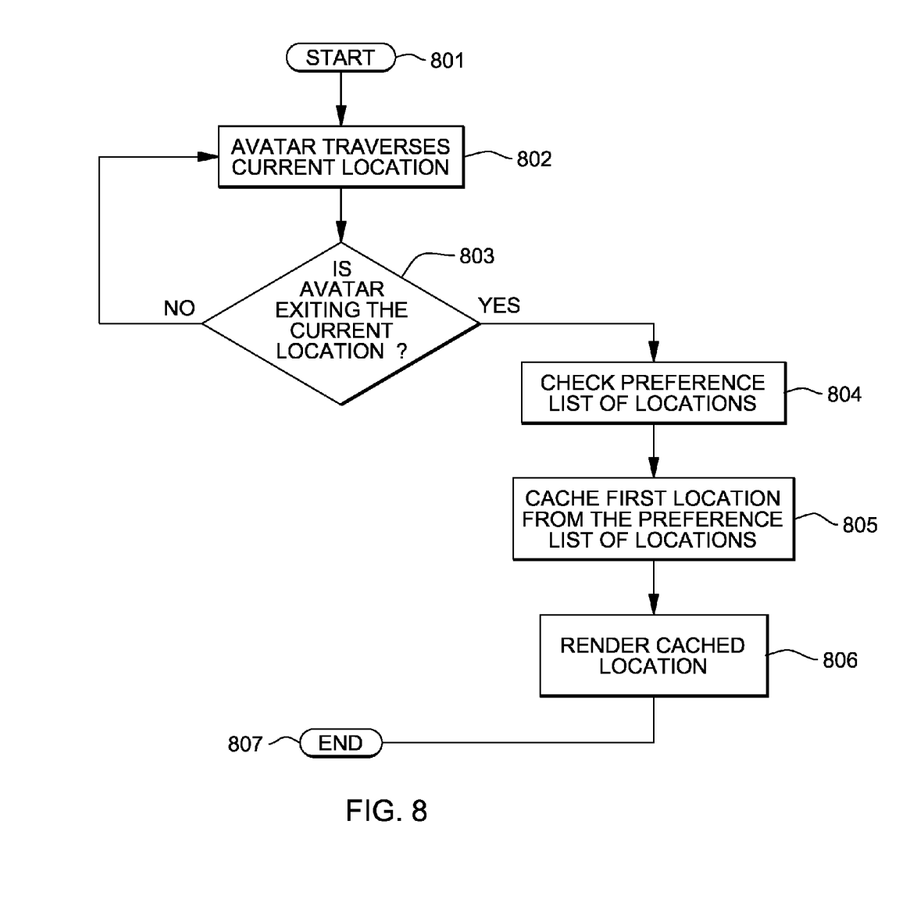
FIG. 8 depicts a flow chart of a method for dynamically rendering of an environment most likely to be visited by visited by the avatar.

FIG. 8 depicts a flow chart of the preferred embodiment of the method for dynamically rendering locations from a preference list of locations most likely to be visited by an avatar. The method begins at step 801, at step 802 avatar continues to traverse current location so no new environment needs to be displayed. At step 803 it is determined whether avatar is exiting the current location. If "no" then avatar continues to traverse current location at 802. If "yes" then at step 804 preference list of locations is checked, then at 805 first location from the preference list is cached. Further, at step 806 the location received from the preference list is rendered.

Figure 9:
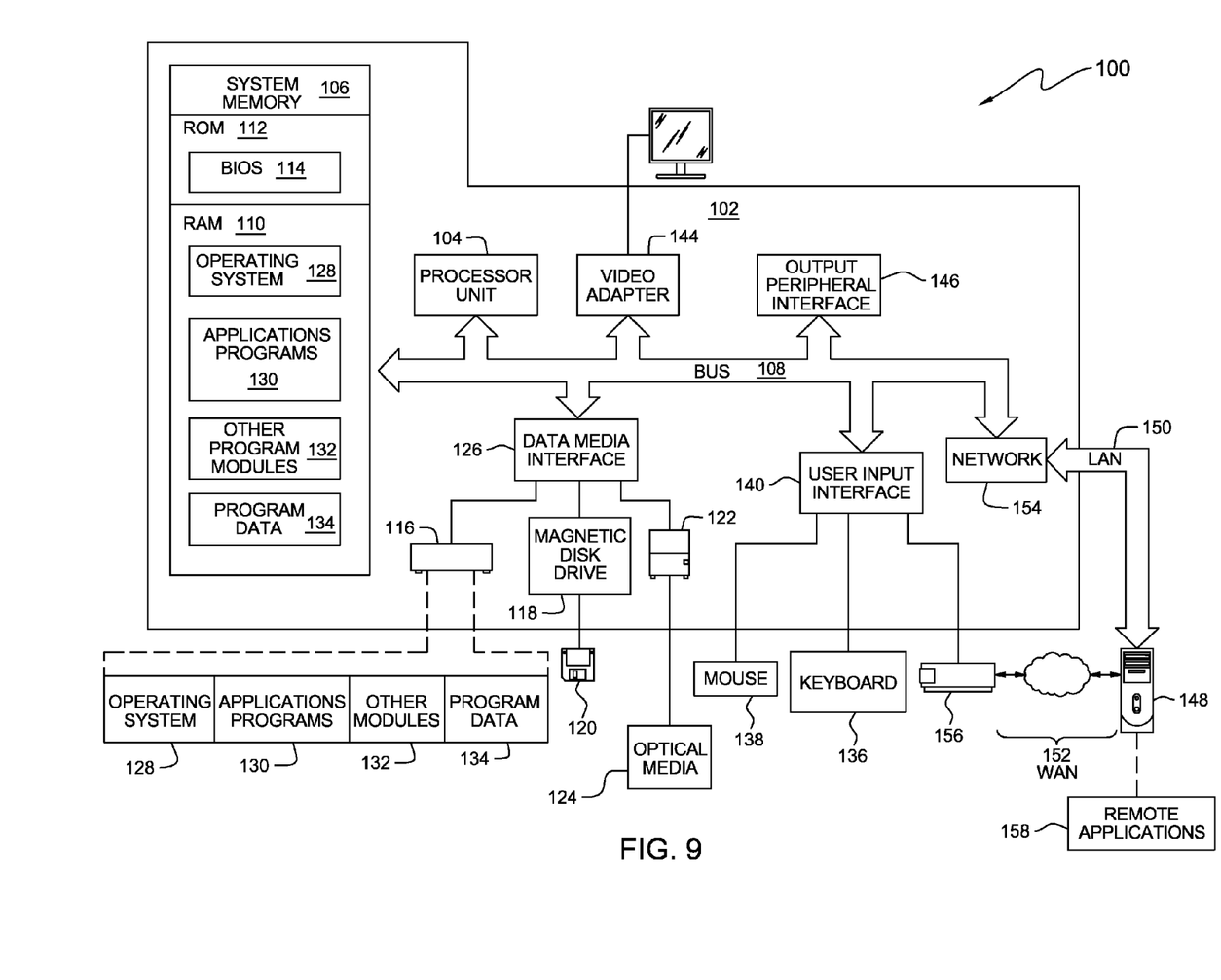
FIG. 9 shows a schematic of an exemplary computing environment where system described in the current invention may operate.

FIG. 9 shows a schematic of an exemplary computing environment in which implemented system for dynamically rendering locations from a preference list of locations most likely to be visited by an avatar may operate. The exemplary computing environment 100 is only one example of a suitable computing environment and is not intended to suggest any limitation as to the scope of use or functionality of the approach described herein. Neither should computing environment 100 be interpreted as having any dependency or requirement relating to any one or combination of components illustrated in FIG. 9.

In the computing environment 100 there is a computer 102, which is operational with numerous other general purpose or special purpose computing system environments or configurations. Examples of well known computing systems, environments, and/or configurations that may be suitable for use with exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on that perform particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 9, computer 102 in the computing environment 100 is shown in the form of a general-purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 9, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 9 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example, and not limitation, an operating system 128, one or more application programs 130, other program modules 132, and program data 134. Each of operating system 128, one or more application programs 130 other program modules 132, and program data 134 or some combination thereof, may include an implementation of the networking environment 10 of FIG. 1 including server array 14, virtual universe client 24 and pre-fetching tool 53. In one embodiment, the one or more application programs 130 include components of pre-fetching tool 53 such as ranking component 80, pre-fetching component 82 and rendering component 88.

Further, a user may enter commands and information into computer 102 through optional input devices such as a keyboard 136 and a pointing device 138 (e.g., a "mouse"). Other input devices (not shown) may include a microphone, joystick, game pad, satellite dish, serial port, scanner, camera, or the like. These and other input devices are connected to processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 9 are a local area network (LAN) 150 and a general wide area network (WAN) 152. Such networking environments are commonplace in offices, enterprise-wide computer networks, intranets, and the Internet. When used in a LAN networking environment, computer 102 is connected to LAN 150 via network interface or adapter 154. When used in a WAN networking environment, the computer typically includes a modem 156 or other means for establishing communications over WAN 152. The modem, which may be internal or external, may be connected to system bus 108 via user input interface 140 or other appropriate mechanism.

In a networked environment, program modules depicted relative to computer 102, or portions thereof, may be stored in a remote memory storage device. By way of example, and not limitation, FIG. 9 illustrates remote application programs 158 as residing on a memory device of remote computer 148. It will be appreciated that the network connections shown and described are exemplary and other means of establishing a communications link between the computers may be used.

An implementation of computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

In another embodiment, there is provided a business method that performs the process of the invention on a subscription, advertising, and/or fee basis. That is, a service provider, such as a Solution Integrator, could offer to provide the functionality described herein. In this embodiment, the service provider can create, maintain, support, etc., a computer infrastructure, similar to computer 102 that performs the process of the invention for one or more customers. In return, the service provider can receive payment from the customers under a subscription and/or fee agreement and/or the service provider can receive payment from the sale of advertising content to one or more third parties.

In still another embodiment, a computer-implemented method for performing the functionality described herein is provided. In this case, a computer infrastructure, such as computer infrastructure 102, can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 102, from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

In yet another embodiment, a data processing system suitable for storing and/or executing program code is provided hereunder that includes at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

While there have been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

What is claimed is:

1. A method for dynamically building and rendering a location environment, upon an avatar's login to a virtual world, from a preference list of locations most likely to be visited by an avatar, said method comprising:
   creating a preference list of locations most likely to be visited by said avatar, said creating a preference list of locations comprising:
      calculating a probability of a next visit to each of said locations by said avatar,
   and
      comparing said probabilities of a next visit to each of said locations by said avatar to determine a priority of said locations to be displayed on said preference list;
   combining at least two neighboring entries from said preference list of locations most likely to be visited by said avatar to dynamically build continuous location environment, and
   caching and thereafter rendering said dynamically built continuous location environment populated from said preference list of locations most likely to be visited by said avatar.

2. The method according to claim 1, said preference list dynamically constructed based upon the locations visited by said avatar during a most recent login.

3. The method according to claim 1, said preference list dynamically constructed based upon a number of times said locations were visited.

4. The method according to claim 1, said preference list dynamically constructed based upon a previous duration of each visit to said locations.

5. The method according to claim 1, said preference list further comprising self-contained fragments of locations most likely to be visited by said avatar, said rendering comprising said fragments, each fragment containing at least one indicator describing or advertising the original complete location of said fragment.

6. The method according to claim 1, said preference list dynamically constructed and updated based on avatar's requests for a set of locations or portions thereof to be included and prioritized in said preference list.

7. The method according to claim 1, said preference list dynamically updated based on crowd sourcing.

8. The method according to claim 1, further comprising dropping a plurality of locations from current rendering equivalent in number to the number of newly cached locations such that the new rendering is comprised of at least one of the locations from said preference list and a subset of the originally displayed environment.

9. A computer system for dynamically rendering a locations environment, upon an avatar's login to a virtual world, from a preference list of locations most likely to be visited by an avatar, comprising:
   at least one processing unit;
   memory operably associated with the at least one processing unit; and
   a preference assessment tool storable in memory and executable by the at least one processing unit, the preference assessment tool comprising:
      a probability calculation component configured to calculate a probability of a next visit to each of locations by said avatar;
      a prioritization component configured to compare said probabilities of next visit to each of locations by said avatar to determine a priority of said locations to be displayed on said preference list; and
      a rendering component configured to continuously render the location environment in the virtual universe, said location environment cached and thereafter rendered based on the priority of said locations to be displayed on said preference list and based on a personalized combination of at least two neighboring entries from said preference list of locations most likely to be visited by said avatar.

10. The preference assessment tool according to claim 9, the probability calculation component further configured to raise said probability for locations visited by said avatar during a most recent login.

11. The preference assessment tool according to claim 9, the probability calculation component configured to raise said probability for locations visited the most number of times during a plurality of logins by said avatar.

12. The probability calculation component according to claim 9, further comprising a component to raise said probability for locations with longest durations of each visit during plurality of logins by said avatar.

13. The probability calculation component according to claim 9, further comprising a component to raise said probability for locations with longest durations of each visit during plurality of logins by said avatar.

14. The prioritization component as in claim 9, further comprising an interface for manually configuring the display order of locations in said preference list.

15. The computer system as in claim 9, further comprising a caching component configured to:
identify a next location from the preference list of locations; and download and cache within a cache, said next location from said preference list of locations.

16. A computer-readable medium storing computer instructions, which when executed, enable a computer system to dynamically build and render a location environment, upon an avatar's login to a virtual world, from a preference list of locations most likely to be visited by an avatar, in a virtual universe, the computer instructions comprising:
creating a preference list of locations most likely to be visited by said avatar, said creating a preference list of locations comprising:
calculating a probability of a next visit to each of said locations by said avatar,
and
comparing said probabilities of a next visit to each of said locations by said avatar to determine a priority of said locations to be displayed on said preference list;
combining at least two neighboring entries from said preference list of locations most likely to be visited by said avatar to dynamically build continuous location environment, and
caching and thereafter rendering said dynamically built continuous location environment populated from said preference list of locations most likely to be visited by said avatar.

17. The computer-readable medium according to claim 16, further comprising instructions for constructing said preference list based upon the locations visited by said avatar during a most recent login.

18. The computer-readable medium according to claim 16, further comprising instructions for constructing said preference list based upon a number of times said locations were visited during plurality of logins by said avatar.

19. The computer-readable medium according to claim 16, further comprising instructions for constructing said preference list based upon durations of each visit to said locations during plurality of logins by said avatar.

20. A method for deploying a rendering tool for use in a computer system that provides building and rendering of a location environment from a preference list of locations most likely to be visited by an avatar in a virtual universe, said method comprising:
providing a computer infrastructure operable to:
create a preference list of locations most likely to be visited by said avatar, said creating a reference list of locations comprising:
calculating a probability of a next visit to each of said locations by said avatar,
and
comparing said probabilities of a next visit to each of said locations by said avatar to determine a priority of said locations to be displayed on said preference list;
combine at least two neighboring entries from said preference list of locations most likely to be visited by said avatar to dynamically build continuous location environment, and
cache and thereafter render said dynamically built continuous location environment populated from said preference list of locations most likely to be visited by said avatar.

\* \* \* \* \*